(12) United States Patent
Yasaki

(10) Patent No.: US 6,421,370 B1
(45) Date of Patent: Jul. 16, 2002

(54) SPECTRUM SPREADING SYSTEM

(75) Inventor: Takahiro Yasaki, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/195,960

(22) Filed: Nov. 19, 1998

(30) Foreign Application Priority Data

Nov. 20, 1997 (JP) ............................................ 9-319912

(51) Int. Cl.$^7$ ............................................. H04L 27/30
(52) U.S. Cl. ....................... 375/141; 375/147; 375/285; 375/296; 455/50.1; 455/56.1; 455/67.3; 455/115; 455/134; 455/135; 370/318; 370/320
(58) Field of Search ................................ 375/130, 140, 375/141, 142, 146, 147, 150, 260, 285, 296, 324, 340; 455/50.1, 56.1, 67.1, 67.3, 67.4, 69, 115, 134, 135, 226.2, 226.3; 370/318, 320, 331, 335, 342

(56) References Cited

U.S. PATENT DOCUMENTS

| | | | | |
|---|---|---|---|---|
| 5,056,109 A | * | 10/1991 | Gilhousen et al. | 375/1 |
| 5,590,409 A | * | 12/1996 | Sawahashi et al. | 455/69 |
| 5,697,053 A | * | 12/1997 | Hanly | 455/33.1 |
| 5,708,969 A | * | 1/1998 | Kotzin et al. | 455/423 |
| 5,734,646 A | * | 3/1998 | I et al. | 370/252 |
| 5,842,114 A | * | 11/1998 | Ozluturk | 455/69 |
| 5,907,543 A | * | 5/1999 | Jeon et al. | 370/335 |
| 5,930,242 A | * | 7/1999 | Mimura | 370/331 |
| 6,085,107 A | * | 7/2000 | Persson et al. | 370/318 |
| 6,175,745 B1 | * | 1/2001 | Bringby et al. | 455/522 |
| 6,208,631 B1 | * | 3/2001 | Kim | 370/332 |

FOREIGN PATENT DOCUMENTS

| | | |
|---|---|---|
| JP | 6-132871 | 5/1994 |
| JP | 6-140976 | 5/1994 |
| JP | 7-95151 | 4/1995 |
| JP | 7-221700 | 8/1995 |
| JP | 8-149563 | 6/1996 |

* cited by examiner

Primary Examiner—Stephen Chin
Assistant Examiner—Dac V. Ha
(74) Attorney, Agent, or Firm—Dickstein, Shapiro, Morin, & Oshinsky, L.L.P.

(57) ABSTRACT

A spread spectrum communication system includes a plurality of mobile stations and a plurality of base stations that share the same frequency and operate independently. Each of the base stations can serve as a local base station and a non-local base station and has an element for always transmitting a pilot signal (base station reference signal) at a constant power level. Each of the mobile stations also has a quality measuring element for measuring base station reference signals received from the local base station and an adjacent base station serving as a non-local base station, and a transmission power controlling element for controlling the power level of a signal transmitted from the relevant mobile station corresponding to the measured results in such a manner that when the relevant mobile station has approached the adjacent base station, the transmission power controlling element decreases the power level of the transmission signal.

12 Claims, 6 Drawing Sheets

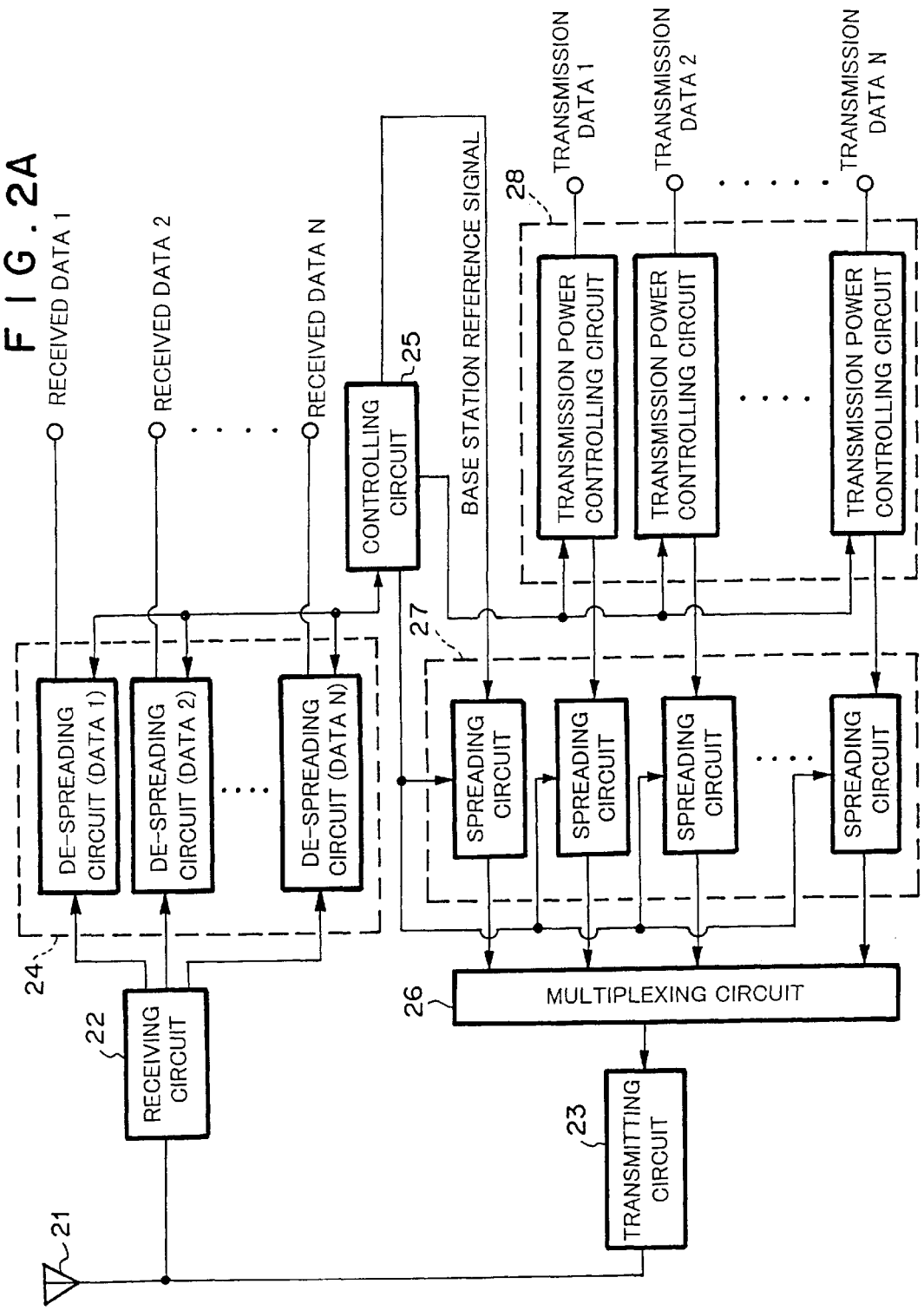

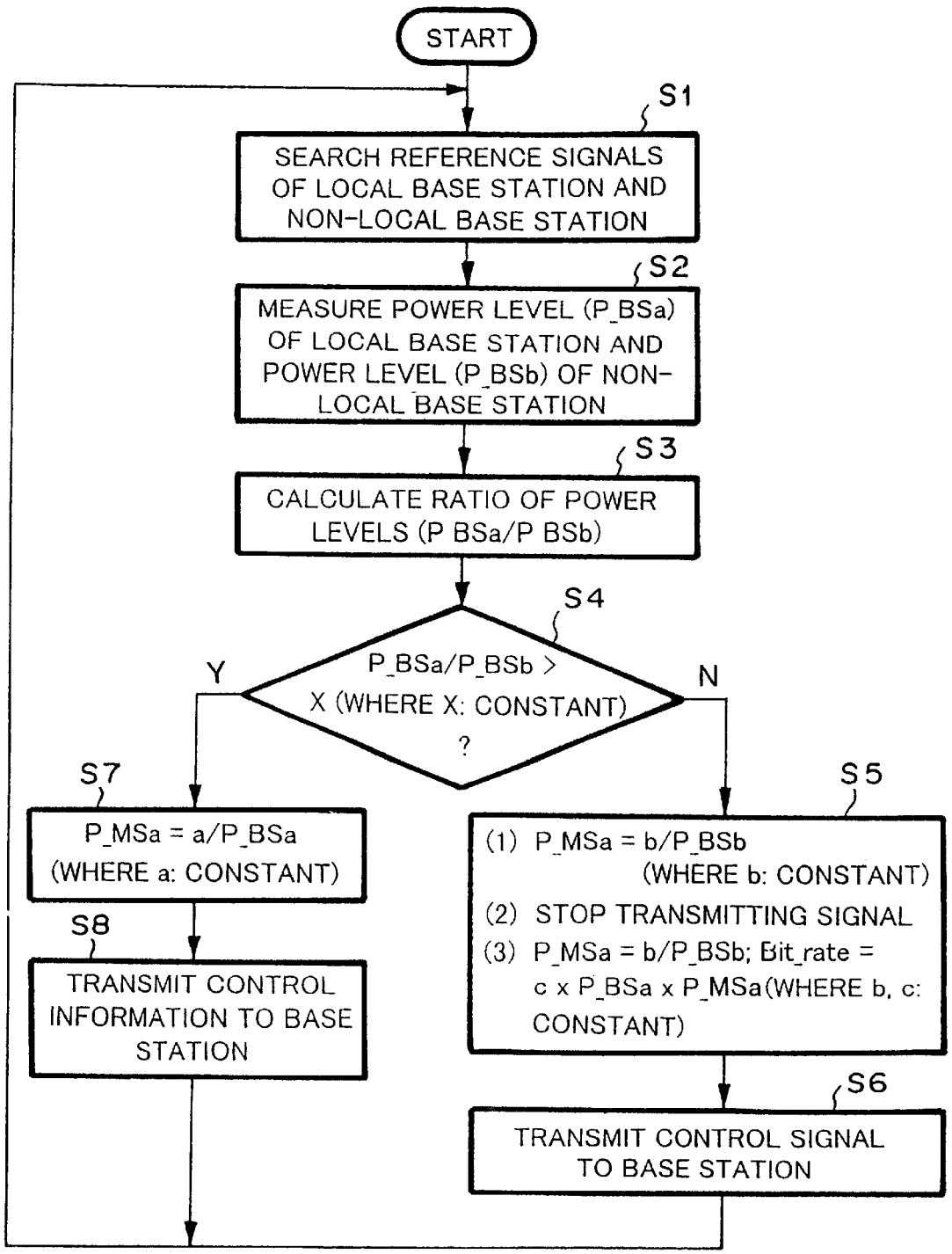

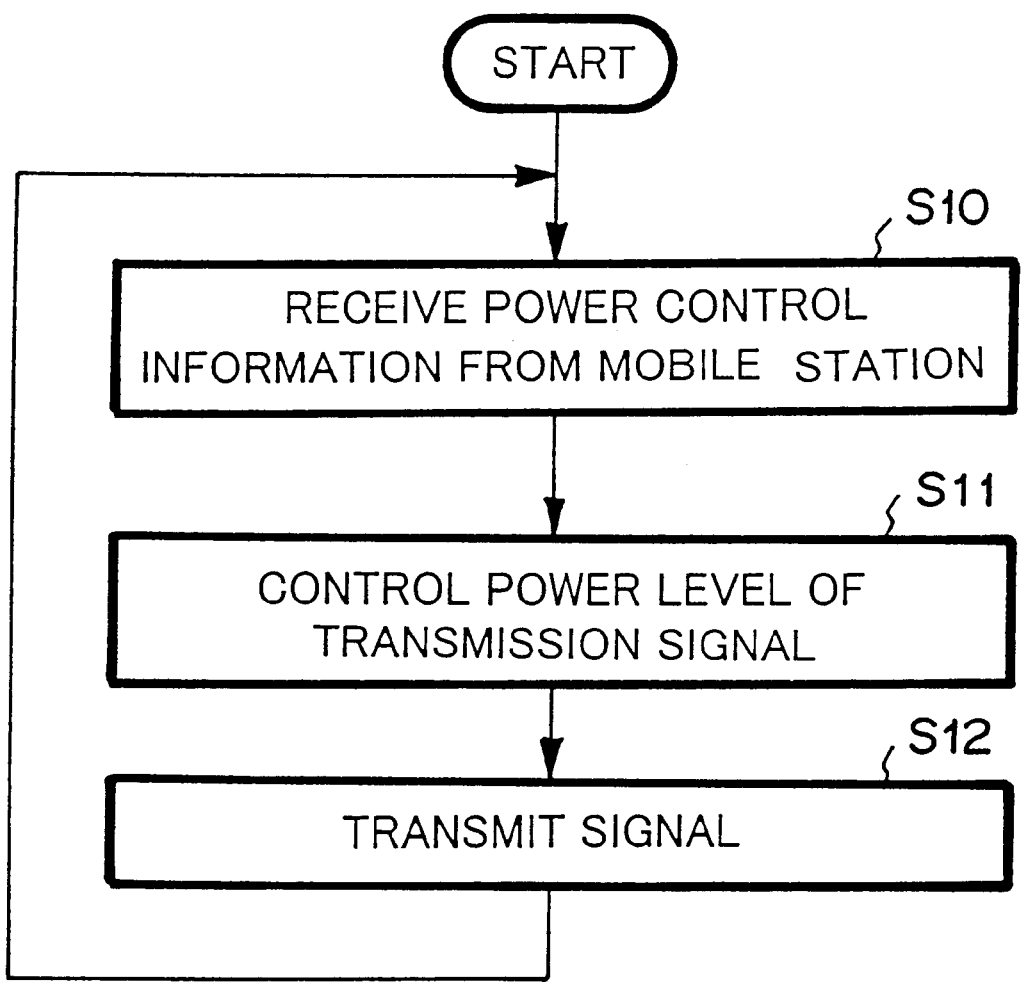

SPECTRUM SPREADING SYSTEM

BACKGROUND OF THE INVENTION

1. Field of the Invention

The present invention relates to a transmission power controlling circuit for use with a wireless communication system such as a cordless telephone system or a wireless LAN of which each base station is not operated, in particular, in accordance with a transmission power controlling circuit for use with a system corresponding to code division multiple access method.

2. Description of the Related Art

In such a conventional power controlling circuit disclosed in Japanese Patent Laid-Open Publication No. 8-149563, as a terminal unit of a cordless telephone system moves away from a main unit thereof, the power controlling circuit of the terminal unit increases the power level of a transmission signal. In contrast, as the terminal unit approaches the main unit, the power controlling circuit of the terminal unit decreases the power level of the transmission signal. Thus the quality of a transmission signal can be always maintained at a constant level.

FIGS. 1A and 1B are block diagrams showing the structures of the main unit and the terminal unit of the cordless telephone system disclosed in Japanese Patent Laid-Open Publication No. 8-149563, respectively.

A transmitting/receiving portion 1 of a radio portion of the main unit shown in FIG. 1A modulates transmission data into a narrow band, band-spreads the resultant data with a spread sequence, and generates a transmission signal. The transmission/reception portion 1 also de-spreads a received signal with a spread sequence, obtains a narrow band signal, and demodulates the resultant signal. A transmission power amplifier 2 and a reception amplifier 3 amplify the transmission/reception signals. A transmission/reception signal sharing unit 4 is used to share an antenna 5 with the transmitted signal and the received signal. A channel table 7 stores spread sequence numbers of an up link signal transmitted from the terminal unit to the main unit and a down link signal transmitted from the main unit to the terminal unit in the order of frequency in use. A reception quality measuring portion 8 measures the received signal and the power level of a received noise. A controlling portion 6 controls the amplification factor of the transmission power amplifier 2 so that the quality of the transmission signal is always maintained in a constant level.

FIG. 1B shows the structure of the terminal unit of the cordless telephone system. The difference between the structure of the main unit and the structure of the terminal unit is in that the terminal unit does not have the channel table 7. In the main unit and the terminal unit, the reception quality level obtained by the reception quality measuring portion 8 (15) is supplied to the transmitting/receiving portion 1 (9) through the controlling portion 6 (14). The transmitting/receiving portion 1 (9) places the reception quality level to the transmission signal.

In the system shown in FIGS. 1A and 1B, even if the terminal unit is away from the main unit, the quality of the transmission signal can be always maintained at constant level. On the other hand, when the terminal unit approaches the main unit, since the quality of the transmission signed is maintained at a constant level, the power levels of the transmission signals of both the main unit and the terminal unit decrease. Thus, the power consumption of the terminal unit decreases and thereby it operates for a long time. In addition, since the power level of the transmission signal decreases, the interference of the transmission signal to another system decreases.

However, in the prior art reference, when the terminal unit is away from the main unit, a signal is transmitted at a high power level.

In other words, when the terminal unit transmits a signal at a large power level near a main unit of another system, the signal interferes with the other system and thereby the line capacity thereof decreases. Sometimes, the signal causes the other system not to operate.

SUMMARY OF THE INVENTION

An object of the present invention is to provide a transmission power controlling method for use with a spread spectrum communication system that shares the same frequency with other systems and operates independently without interfering with the other systems.

The present invention is a spread spectrum Communication system having a plurality of mobile stations and a plurality of base stations that share the same frequency and operate independently, wherein each of the base stations may be identified as a local base station or as a non-local base station relative to each respective mobile station and wherein each base station has a means for always transmitting a pilot signal (base station reference signal) at a constant power level, and wherein each of the mobile stations has a quality measuring means for measuring base station signals received from the local base station and an adjacent base station identified as one of the non-local base stations relative to a relevant mobile station, and a transmission power controlling means for controlling the power level of a signal transmitted from the relevant mobile station corresponding to the measured results in such a manner that when the relevant mobile station approaches the adjacent base station, the transmission power controlling means decreases the power level of the transmission signal.

According to the present invention, the mobile station measures the power level of the transmission signal of the local base station and the power level of the transmission signal of an adjacent base station, compares the power levels, and controls the power levels corresponding to the compared results. For example, when the mobile station determines that the mobile station is close to the local base station, as the mobile station moves away from the local base station, the mobile station increases the power level of the transmission signal. In contrast, as the mobile station approaches an adjacent base station, the mobile station decreases the power level of the transmission signal. Thus, the interference to the adjacent base station decreases. Consequently, the communication efficiency of the entire radio communication system improves.

These and other objects, features and advantages of the present invention will become more apparent in light of the following detailed description of a best mode embodiment thereof, as illustrated in the accompanying drawings.

BRIEF DESCRIPTION OF DRAWINGS

FIGS. 2A and 2B are block diagrams showing the structures of a base station and a mobile station of a spectrum spreading communication system according to an embodiment of the present invention;

FIG. 3 is a flow chart showing the operation of the mobile station according to the present invention; and FIG. 4 is a flow chart showing the operation of the base station according to the present invention.

DESCRIPTION OF PREFERRED EMBODIMENTS

Next, with reference to the accompanying drawings, embodiments of the present invention will be described.

Figure 1A:
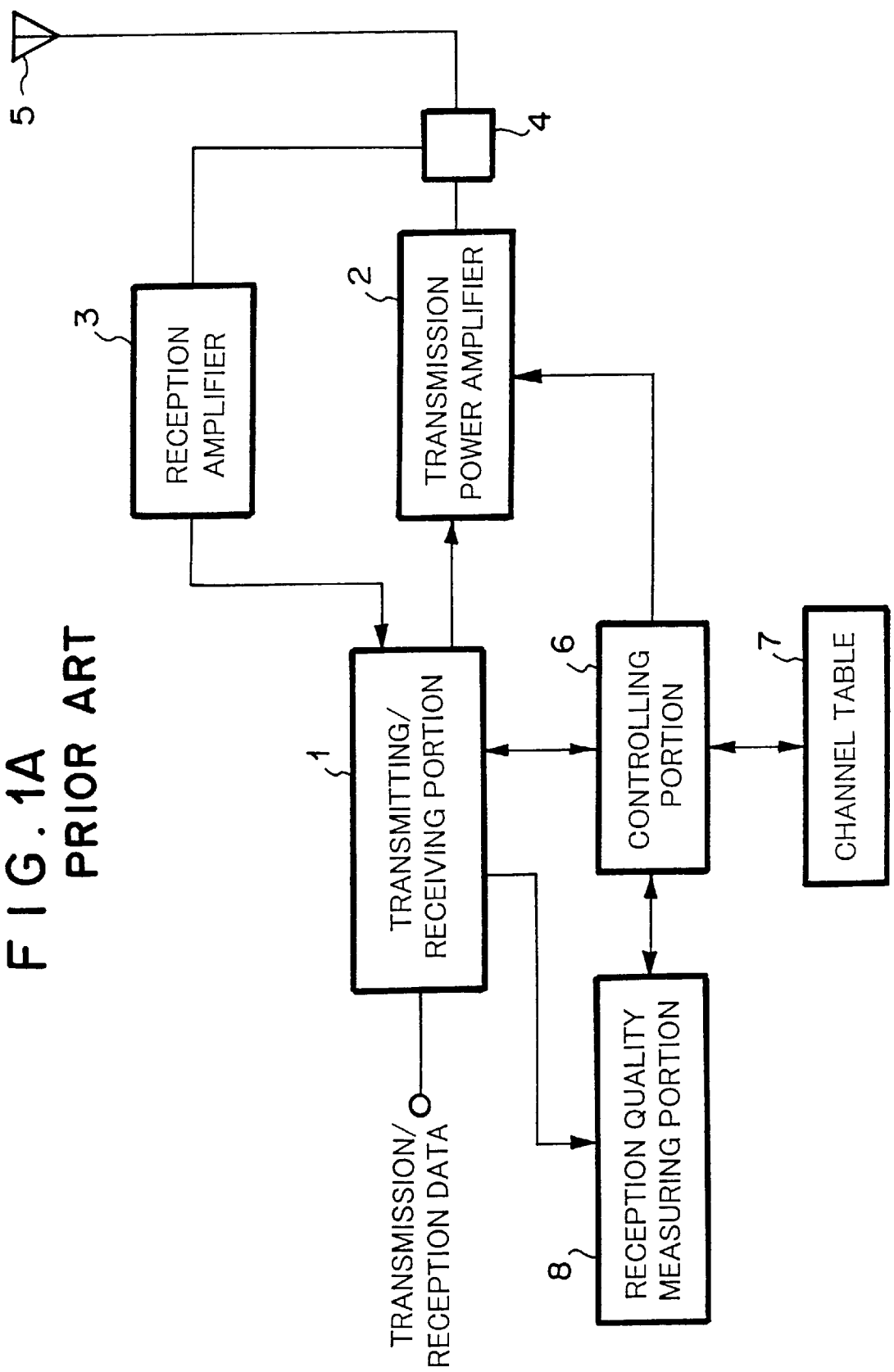
FIGS. 1A and 1B are block diagrams showing the structures of a main unit and a terminal unit of a conventional cordless telephone system that control power levels of respective transmission signals.
Figure 1B:
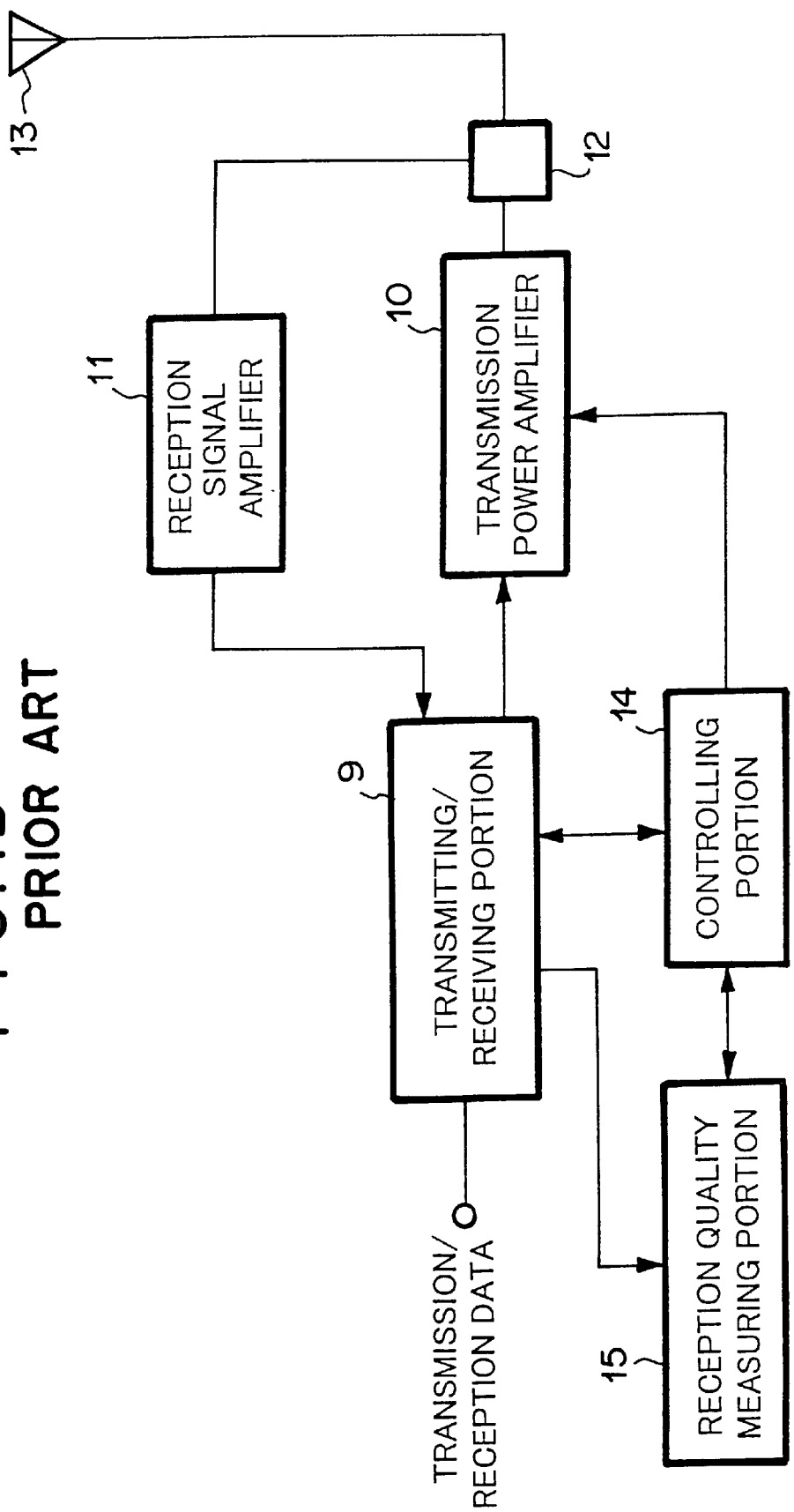
Figure 2B:
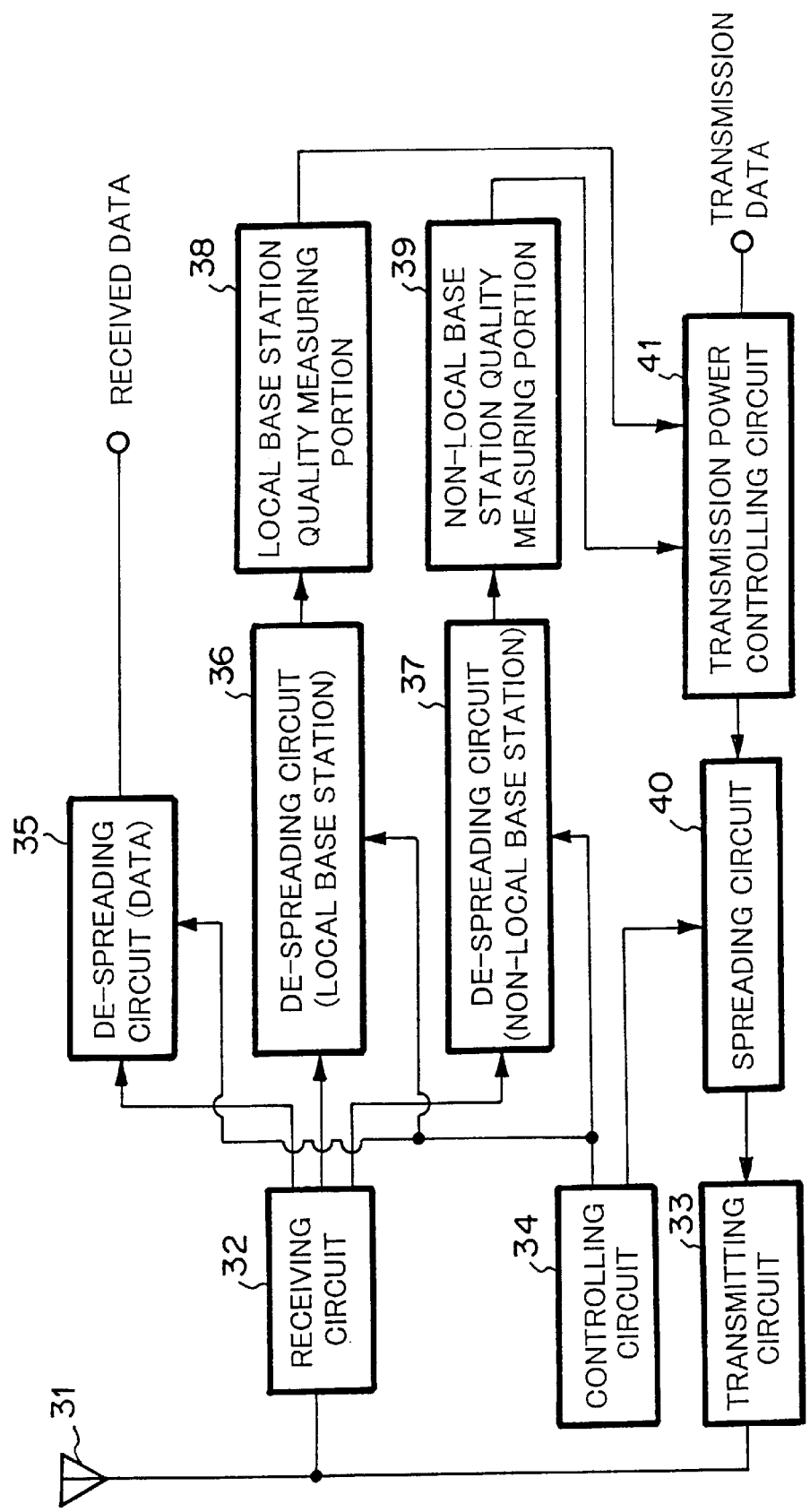

FIGS. 2A and 2B are block diagrams showing the structures of a base station and a mobile station of a spectrum spreading communication system according to a first embodiment of the present invention.

Referring to FIGS. 2A and 2B, the spectrum spreading communication system is composed of the base station (FIG. 2A) and a plurality of mobile stations (FIG. 2B). The base station is a regionally fixed station. In the case of a cordless telephone system, the base station is a main unit. In contrast, a mobile station can be freely moved. In the case of such a cordless telephone system, the mobile station is a terminal unit. In the case of a wireless LAN system, the mobile station is a terminal that communicates with a base station of the system.

In the base station, an antenna 21 is an element that receives and transmits a signal. A receiving circuit 22 demodulates a radio wave reception from the antenna 21 into a base band signal. The base band signal is supplied to de-spreading circuits 24 of individual channels. Each of the de-spreading circuits 24 de-spreads a signal that has been multiplexed with a spread code for the relevant channel and outputs received data of the relevant channel.

The received data contains transmission power control information for a reception from a relevant mobile station. Transmission power controlling circuits 28 of the individual channels control power levels of transmission signals of the individual channels corresponding to the transmission power control information. A controlling circuit 25 generates a base station reference signal. The base station reference signal is a pilot signal that is always transmitted at a constant power level. The base station reference signal contains transmission power information of the base station reference signal. Thereafter, each of spreading circuits 27 multiplies the transmission data of each channel by a spread code assigned by the controlling circuit 25 and outputs spread data. A multiplexing circuit 26 multiplexes the spread data of each channel. The multiplexed signal is supplied to a transmitting circuit 23. The transmitting circuit 23 frequency-modulates the multiplexed signal. The resultant signal is transmitted as a radio wave from the antenna 21.

As with the base station, in each of the mobile stations, an antenna 31 transmits and receives a signal. A receiving circuit 32 demodulates a radio wave received from the antenna 31 into a base band signal. The base band signal is supplied to de-spreading circuits 35, 36, and 37. The de-spreading circuit (local base station) 36 demodulates a base station reference signal transmitted from the local base station. In other words, the de-spreading circuit 36 de-spreads the base station reference signal corresponding to a spread code of a reference signal. The de-spreading circuit (non-local base station) 37 receives a base station reference signal of another base station which the mobile station is approaching. Since the spread code is unknown, a controlling circuit 34 searches for a relevant spread code. Thereafter, the de-spreading circuit 37 demodulates the obtained spread code. The de-spreading circuit (data) 35 de-spreads transmission data.

A local base station quality measuring portion 38 obtains quality data such as a power level and a data error ratio of the base station reference signal of the local base station. Likewise, a non-local base station quality measuring portion 39 obtains quality data such as a power level of the base station reference signal of the non-local base station. A transmission power controlling circuit 41 controls the power level of the transmission signal corresponding to the measured results of the local base station quality measuring portion 38 and the non-local base station quality measuring portion 39 so that the transmission power of the mobile station does not adversely affect the non-local base station. The mobile station adds the transmission power control signal to the transmission data and transmits the resultant signal to the base station. A spreading circuit 40 spreads transmission data containing the transmission power control information. A transmitting circuit 33 modulates the spread signal. The antenna 31 transmits the modulated signal as a radio wave.

Next, with reference to the accompanying drawings, the operation of the first embodiment of the present invention will be described.

In the following description, the local base station is referred to as base station A; the mobile station is referred to as mobile station A; and the non-local base station is referred to as base station B. With reference to a flow chart shown in FIG. 3, the operation of the mobile station A will be described.

FIG. 3 is a flow chart showing the operation of the mobile station according to the first embodiment of the present invention.

At step (S1), the mobile station searches the base station reference signals of the local base station and the non-local base station. The base station reference signal is a pilot signal that is always transmitted in a constant power level. The base station reference signal contains transmission power information. Since a spread code of a reference signal of the base station A is known, the de-spreading circuit 36 can obtain the reference signal of the base station A by de-spreading the base station reference signal. On the other hand, since the spread code of the reference signal of the base station B is unknown, the controlling circuit 34 should obtain a spread code. For example, when two types of spread codes that are a short code and a long code are used and the short code of the base station reference signal is the same for each base station, the base station reference signals of the local base station and the non-local base station can be easily searched.

After the mobile station A synchronizes with the base station reference signals of the base station A and the base station B, the flow advances to step (S2). At step (S2), the local base station quality measuring portion 38 and the non-local base station quality measuring portion 39 obtain quality data of the base station A and the base station B, respectively. The quality data includes information such as a propagation loss (attenuation amount) of the base station reference signal, Eb/No, SIR (Signal Interference Ratio), and the distance between each base station to the mobile station A. Since the base station reference signal of each base station contains information such as a transmission power level of each base station, the quality measuring portions 38 and 39 can determine the propagation loss by measuring received power levels. Likewise, the quality measuring portions 38 and 39 can determine Eb/No and SIR. In the system, when the base station reference signals are fully synchronous, the distance between each base station and the mobile station A can be determined.

After the mobile station A has measured the quality data of each base station, the flow advances to step (S3). At step (S3), the transmission power controlling circuit 41 determines the difference between the quality data of the local base station and the quality of the non-local base station. In other words, at step (S2), the local base station quality measuring portion 38 and the non-local base station quality measuring portion 39 may determine the ratio of the power levels or distances. Thereafter, the flow advances to step (S4). At step (S4), the mobile station determines whether or not the value obtained at step (S3) is larger than a predetermined value X and selects an appropriate one of the transmission power controlling methods described below. When the determined result at step (S4) is Yes, the flow advances to step (S7). When the determined result at step (S4) is No, the flow advances to step (S5).

When the ratio between the power level of the local base station and the power level of the non-local base station is larger than the predetermined value X, the mobile station A determines that it is close to the base station A. In this case, the mobile station A performs the normal power controlling operation. In other words, as the mobile station A moves away from the base station A (as the base station reference power level of the base station A decreases), the mobile station A increases the power level of the transmission signal.

When the transmission power of the mobile station A is denoted by $P\_MSa$; the power level of a signal transmitted from the base station A to the mobile station A is denoted by $P\_BSa$; and the power level of a signal transmitted from the base station B to the mobile station A is denoted by $P\_BSb$, the mobile station A controls the power level of the transmission signal so that $P\_MSa$ is inversely proportional to $P\_BSa$ (at step (S7)). Likewise, the mobile station A transmits a control signal to the base station A so that the base station A transmits a signal to the mobile station at a power level that is inversely proportional to $P\_BSa$.

In contrast, when the value obtained at step S3 is the predetermined value X or less, the mobile station A determines that it has approached the base station B and controls the power level of the transmission signal in one of the following three controlling methods so as to decrease the interference of the transmission signal to the base station B.

In the first method, as the mobile station A approaches the base station B and thereby the value obtained at step (S3) falls below the predetermined (threshold) value X, the mobile station A decreases the power level of the transmission signal (method (1) at step (S5)). For example, the mobile station A controls the power level of the transmission signal so that $P\_MSa$ is inversely proportional to $P\_BSb$. In addition, when the value obtained at step (S3) does not exceed the predetermined value X, the mobile station A causes the base station A not to increase the power level of the transmission signal (at step (S6)). In this case, although the communication quality (such as BER) with the base station A deteriorates, the influence of the transmission signal of the mobile station A on the base station B can be suppressed.

In the second method, when the mobile station A is approaching the base station B and thereby the value obtained at step (S3) falls below the predetermined value X, the mobile station A stops transmitting the signal to the base station A (method (2) at step (S5)). Alternatively, the base station A stops transmitting a signal to the mobile station A. In this method, although the signal transmitted to the base station A is stopped, the base station B is not adversely affected.

In the third method, when the mobile station A is approaching the base station B and thereby the value obtained at step (S4) falls below the predetermined value X, the mobile station A decreases the power level of the transmission signal to the base station A and decreases the bit rate of the transmission signal (method (3) at step (S5)). For example, the mobile station A controls the power level of the transmission signal so that $P\_MSa$ is inversely proportional to $P\_BSb$ and that the bit rate is proportional to the product of $P\_BSa$ and $P\_MSa$. In other words, valid data bits are decreased and error correction bits are added so as to maintain the communication quality. As with the first method, the mobile station A causes the base station A not to increase the power level of the transmission signal (at step (S6)). In this method, since the bit rate is decreased, the transmission signal of the mobile station A does not adversely affect the base station B. Thus, in the third method, the communication quality can be prevented from deteriorating. In addition, the interference of the transmission signal of the mobile station A with the base station B can be suppressed.

The mobile station A repeatedly performs the process from step (S1) to step (S8).

Next, with reference to a flow chart shown in FIG. 4, the operations of the base stations A and B will be described.

At step (S10), the de-spreading circuit 24 de-spreads transmission data of each mobile station. The received data contains power control information as transmission power control bits. At step (S11), the transmission power controlling circuit 28 adds the power control information to the transmission signal and transmits the resultant signal to each mobile station at the respective power level (at step (S12)). Thus, the base station A can control the power level of the transmission signals.

Next, with reference to the accompanying drawings, a spectrum spread communication system according to a second embodiment of the present invention will be described.

Referring to FIG. 2B, the de-spreading circuit (non-local base station) 37 of the three de-spreading circuits de-spreads the base station reference signal of the base station B. In the first embodiment, the de-spreading circuit 37 measures the power level of the base station reference signal of the base station B. In the second embodiment, the de-spreading circuit 37 measures the power level of the base station reference signal of the base station B and the state of the communication traffic (load) of the base station B.

For example, the mobile station A receives a base station reference signal that contains load information of the base station B. Alternatively, the mobile station A measures the interference level of a transmission signal of the base station B and measures the interference level of a transmission signal of the base station B and measures the state of the communication traffic of the base station B. The base station B has a resistance to interference from the transmission signal of the mobile station A related to the amount of communication traffic at base station B. Thus, the predetermined value X at step (S4) shown in FIG. 3 may be decreased accordingly. Assuming that the coefficient that represents the load of the base station B relative to the full traffic state is denoted by L (1 or less) and that the predetermined value (threshold value) is denoted by X, in the second embodiment, the threshold value is defined as the product of X and L. In other words, in comparison with the situation in which the communication traffic is high, a signal can be transmitted in a higher power level when the communication traffic at the base station is lower.

When the communication traffic of the base station B is low, the mobile station A can travel in a wider range during communication. As with the first embodiment, in the second embodiment, three power controlling methods can be used.

Next, with reference to the accompanying drawings, a spectrum spreading communication system according to a third embodiment of the present invention will be described.

In the third embodiment, as with the second embodiment, a de-spreading circuit (non-local base station) 37 is used. When the mobile station A has approached the base station B and thereby the value obtained at step (S3) exceeds the predetermined value X, the mobile station A communicates with the base station B and causes the base station B to control the power level of the transmission signal of the mobile station A. The base station B measures the power level of the transmission signal of the mobile station A using a blank channel. Thereafter, a controlling circuit 25 controls the power level of the transmission signal of the base station B and transmits transmission power control information to the mobile station A. In the mobile station A, a de-spreading circuit 37 extracts the power control information. A transmission power controlling circuit 41 controls the power level of the transmission signal of the mobile station A.

In the third embodiment, when the base station B has a sufficient amount of communication traffic space, the base station has a resistance to the interference of the transmission signal of the base station A, and therefore the predetermined value X at step (S4) shown in FIG. 3 can be decreased. In addition, since the mobile station A communicates with the base station B, they can be mutually controlled. Thus, the power control accuracy is improved. Moreover, as with the first and second embodiments, three transmission power control methods can be used. In the above-described embodiments, a case in which each base station is not organized was described. However, it should be noted that the present invention can be applied to a case in which each base station is organized.

An as effect of the present invention, in a spectrum spreading communication system that shares the same frequency with other systems and operates independently, since interference from a transmission signal of an adjacent station is suppressed, the line capacity of another system can be decreased. In addition, the other system can be prevented from not communicating.

This is because the power level of the base station reference signal of the local base station and the power level of the base station reference signal of the non-local base station are measured. Thus, when the mobile station has approached the non-local base station, the mobile station decreases the power level of the transmission signal so as to prevent the transmission signal from adversely affecting the non-local base station.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A spread spectrum communication system having a plurality of mobile stations and a plurality of mobile stations and that share the same frequency and operate independently, wherein each of the base stations may be identified as a local base station or a non-local base station relative to each respective mobile station, and wherein each base station includes:

means for always transmitting a pilot signal (base station reference signal) at a constant power level, and wherein each of the mobile stations has:

quality measuring means for measuring base station reference signals received from the local base station and an adjacent base station identified as one of the non-local base stations relative to the relevant mobile station; and transmission power controlling means for controlling the power level of a signal transmitted from the relevant mobile station corresponding to the measured results in such a manner that when the relevant mobile station is approaching the adjacent base station, said transmission power controlling means decreases the power level of the transmission signal.

2. The spread spectrum communication system as set forth in claim 1, wherein said transmission power controlling means stops transmitting a signal when the relevant mobile station is approaching the adjacent base station.

3. The spread spectrum communication system as set forth in claim 1, wherein said transmission power controlling means decreases the power level of the transmission signal and a bit rate of the transmission signal when the relevant mobile station is approaching the adjacent base station.

4. A spread spectrum communication system having a plurality of mobile stations and a plurality of mobile stations and that share the same frequency and operate independently, wherein each of the base stations may be identified as a local base station or as a non-local base station relative to each respective mobile station, and wherein each base station includes:

means for always transmitting information on a traffic load state, and wherein each of the mobile stations has;

quality measuring means for measuring a traffic load state of an adjacent base station identified as a non-local base station relative to the relevant mobile station; and transmission power controlling means for controlling the power of a signal transmitted from the relevant mobile station corresponding to the measured results in such a manner that when the relevant mobile station is approaching the adjacent base station, said transmission power controlling means decreases the power level of the transmission signal corresponding to the measured traffic load state of the adjacent base station.

5. The spread spectrum communication system as set forth in claim 4, wherein said transmission power controlling means stops transmitting a signal when the relevant mobile station is approaching the adjacent base station.

6. The spread spectrum communication system as set forth in claim 4, wherein said transmission power controlling means decreases the power level of the transmission signal and a bit rate of the transmission signal when the relevant mobile station is approaching the adjacent base station.

7. A spread spectrum communication system having a plurality of mobile stations and a plurality of base stations that share the same frequency and operate independently, wherein each of the mobile stations relevant to a local base station and non-local base stations includes:
de-spreading circuit means for receiving a signal from an adjacent base station identified as one of the non-local base stations; and
transmission power controlling means for controlling the power level of a transmission signal corresponding to the power control information of the local base station;

wherein the local base station includes:
de-spreading circuit means for receiving a signal from a relevant mobile station; and
a transmission power controlling circuit for transmitting transmission power control information to the relevant mobile station corresponding to a received state of said de-spreading circuit means and a load state of the local base stations, and wherein when the relevant mobile station is approaching the adjacent base station, the local base station causes the relevant mobile station to lower the power level of the transmission signal.

8. The spread spectrum communication system as set forth in claim 7, wherein said transmission power controlling means stops transmitting a signal when the relevant mobile station is approaching the adjacent base station.

9. The spread spectrum communication system as set forth in claim 7, wherein said transmission power controlling means decreases the power level of the transmission signal and a bit rate of the transmission signal when the relevant mobile station is approaching the adjacent base station.

10. A mobile station of a spread spectrum communication system having a plurality of mobile stations and a plurality of base stations which each may be identified as a local base station or as a non-local base station relative to each mobile station, wherein the plurality of base stations share the same frequency and independently, the mobile station comprising:

quality measuring means for measuring base station reference signals of the local base station and an adjacent base station identified as one of the non-local base stations; and transmission power controlling means for controlling the power level of a transmission signal corresponding to the measured results in such a manner that when the mobile station is approaching the adjacent base station, said transmission power controlling means decreases the power level of the transmission signal.

11. The mobile station of the spread spectrum communication system as set forth in claim 10, wherein said transmission power controlling means stops transmitting a signal when the relevant mobile station is approaching the adjacent base station.

12. The mobile station of the spread spectrum communication system as set forth in claim 10, wherein said transmission power controlling means decreases the power level of the transmission signal and a bit rate of the transmission signal when the relevant mobile station is approaching the adjacent base station.

* * * * *